(12) United States Patent
Boos et al.

(10) Patent No.: US 12,728,915 B2
(45) Date of Patent: Sep. 8, 2026

(54) METHOD FOR OPERATING A VEHICLE

(71) Applicant: Robert Bosch GmbH, Stuttgart (DE)

(72) Inventors: Nicolas Boos, Mutlangen (DE); Thomas Werner, Aalen (DE)

(73) Assignee: Robert Bosch GmbH, Stuttgart (DE)

( * ) Notice: Subject to any disclaimer, the term of this patent is extended or adjusted under 35 U.S.C. 154(b) by 522 days.

(21) Appl. No.: 18/349,240

(22) Filed: Jul. 10, 2023

(65) Prior Publication Data

US 2024/0010270 A1 Jan. 11, 2024

(30) Foreign Application Priority Data

Jul. 11, 2022 (DE) ..................... 10 2022 207 031.3

(51) Int. Cl.
*B62D 6/02* (2006.01)

(52) U.S. Cl.
CPC ..................................... *B62D 6/02* (2013.01)

(58) Field of Classification Search
CPC ........ B62D 6/02; B62D 5/0484; B62D 5/049; B62D 6/007; B62D 5/0481
See application file for complete search history.

(56) References Cited

U.S. PATENT DOCUMENTS

2019/0305706 A1* 10/2019 Kim ...................... H02P 29/024

FOREIGN PATENT DOCUMENTS

DE 10 2017 209 745 A1 12/2018
DE 10 2019 214 225 A1 3/2021

* cited by examiner

*Primary Examiner* — Long T Tran
*Assistant Examiner* — Charles J Brauch
(74) *Attorney, Agent, or Firm* — Maginot, Moore & Beck LLP

(57) ABSTRACT

A method is for operating a vehicle including a steering system having a steering handle and at least one wheel steering angle actuator operatively connected to the steering handle for changing a wheel steering angle of at least one vehicle wheel. The method includes, in a normal operating state, controlling at least one steering functionality depending on an operating parameter correlated with a current vehicle speed, and, in an operational fault state in which an availability of the operating parameter is restricted and/or a failure of the operating parameter is determined, replacing the operating parameter by a replacement parameter correlated to a replacement speed. The method also includes performing a situationally adjusted transition from the operating parameter to the replacement parameter.

11 Claims, 2 Drawing Sheets

METHOD FOR OPERATING A VEHICLE

This application claims priority under 35 U.S.C. § 119 to patent application no. DE 10 2022 207 031.3, filed on Jul. 11, 2022 in Germany, the disclosure of which is incorporated herein by reference in its entirety.

The disclosure is based upon a method for operating a vehicle as described herein. The disclosure also relates to a computing unit for performing such a method and a vehicle comprising such a computing unit.

BACKGROUND

Vehicles are known comprising a conventional steering system having a steering handle, e.g., in the form of a steering wheel, a wheel steering angle actuator in the form of a steering gear, and a steering column for mechanically connecting the steering handle with the wheel steering angle actuator. Further known are vehicles having steer-by-wire steering systems, which omit a direct mechanical connection between a steering handle and the steered vehicle wheels, and in which a steering preference is relayed to the steering handle exclusively electrically. Such steer-by-wire steering systems are typically equipped with a wheel steering angle actuator in the form of a central actuator, or with multiple wheel steering angle actuators in the form of individual wheel actuators.

It is also known to couple certain vehicle and/or steering functions with a current vehicle speed and to control and/or vary those vehicle and/or steering functions depending on an operating parameter correlated with the current vehicle speed. Purely by way of example, reference is in this context made to DE 10 2019 214 225 A1.

In this case, however, a sudden loss of vehicle speed can, e.g., lead to situations when driving through tight turns in which the vehicle is no longer controllable without suitable countermeasures.

Therefore, the object of the disclosure is in particular to provide a method for operating a vehicle, which provides improved features with respect to operational safety.

SUMMARY

The disclosure is based on a method, which is in particular computer-implemented, for operating a vehicle, in particular a motor vehicle, wherein the vehicle comprises a steering system having a steering handle and at least one wheel steering angle actuator operatively connected to the steering handle for changing a wheel steering angle of at least one vehicle wheel and, wherein in a normal operating state, at least one steering functionality is controlled and/or varied depending on an operating parameter correlated with a current vehicle speed.

It is proposed that, in an operational fault state in which an availability of the operating parameter is restricted and/or a failure of the operating parameter is determined, the operating parameter is replaced by a replacement parameter correlated with a replacement speed, wherein a situationally adjusted transition from the operating parameter to the replacement parameter takes place. In particular, the steering functionality is then controlled and/or varied in the operational fault state depending on the replacement parameter. Operational safety can be increased by means of this configuration. In particular, improved controllability and/or improved behavior of the vehicle can be achieved when the vehicle speed is lost.

In the present case, the steering system can be designed as a conventional steering system, in particular as an electric power steering system, and can comprise a mechanical hand grip. The steering system is preferably designed as a steer-by-wire steering system, in which a steering command, in particular from a driver, is advantageously transmitted to the vehicle wheels purely electrically. The term "wheel steering angle actuator" is in particular intended to mean an actuator unit operatively connected to at least one vehicle wheel and provided for transmitting a steering command, e.g. that of a driver, to the vehicle wheel by changing a wheel steering angle of at least one vehicle wheel and thereby advantageously control at least one alignment of the vehicle wheel and/or influence a direction of travel of the vehicle. For this purpose, the wheel steering angle actuator advantageously comprises at least one steering actuating element, e.g., in the form of a toothed rack, and at least one steering actuator which is operatively connected to the steering actuating element, e.g., in the form of an electric motor. In this case, the wheel steering angle actuator can in particular be associated with a front axle or a rear axle of the vehicle. In addition, the wheel steering angle actuator can be designed as a central actuator and can be associated with at least two, in particular steerable, vehicle wheels or designed as a single wheel actuator and precisely one, in particular steerable, vehicle wheel. The term "provided" is in particular intended to mean specifically programmed, designed, and/or equipped. The phrase "an object being provided for a specific function" is particular intended to mean that the object fulfills and/or performs this specific function in at least one application and/or operating state.

The vehicle also comprises at least one computing unit, which is provided to perform the method for operating the vehicle. The term "computing unit" is in particular intended to mean an electrical and/or electronic unit which comprises an information input, an information processor, and an information output. The computing unit advantageously further comprises at least one processor, at least one memory, at least one input and/or output means, at least one operating program, at least one control routine, at least one calculation routine, at least one evaluation routine, at least one adaptation routine, and/or at least one determination routine. In particular, the computing unit is provided to control and/or vary at least one steering functionality of the steering system in a normal operating state depending on an operating parameter correlated with a current vehicle speed. In this context, the computing unit can be provided to determine and/or evaluate a current vehicle speed. Moreover, the computing unit is provided, in an operational fault state in which an availability of the operating parameter is restricted and/or a disruption of the operating parameter is determined, to replace the operating parameter with a replacement parameter correlated with a replacement speed and to situationally adjust a transition from the operating parameter to the replacement parameter. The computing unit is in this case preferably integrated into a control device of the vehicle, e.g., a central vehicle control device, or a control device of the steering system, in particular in the form of a steering control device.

Furthermore, the term "steering functionality" is in particular intended to mean a functionality associated with a driving and/or steering function, which is dependent on a current vehicle speed and in particular has a direct or indirect impact on a steering behavior and/or lateral guidance of the vehicle. In addition, the term "operating parameter" is intended to mean a parameter that is correlated with a current vehicle speed, and determined and/or determinable for controlling and/or varying the steering functionality, in particular during driving operation of the vehicle. In particular, the operating parameter can in this case be the current vehicle speed or a parameter corresponding to the current vehicle speed. In addition, the term "replacement parameter" is intended to mean a parameter correlated with a replacement speed different from the current vehicle speed and preferably applied in advance for controlling and/or varying the steering functionality, which can be determined, e.g., during the manufacture of the vehicle and/or the steering system and stored in an operational memory of the vehicle. In particular, the replacement parameter can be selected independent of a current vehicle speed, or it can be based on a current vehicle speed. For example, the replacement parameter can automatically be the replacement speed or a parameter corresponding to the replacement speed. Further, the replacement parameter is preferably different from a redundant operating parameter, e.g., from a redundant detection sensor system. The phrase "a situationally adjusted transition from the operating parameter to the replacement parameter is performed" is intended to mean that a preferably continuous and/or gradual transition from the operating parameter to the replacement parameter is performed depending on the current driving and/or steering situation of the vehicle, i.e., in particular via a variable or situationally adjustable time interval and/or via a variable or situationally adjustable function. Preferably, a transition from the operating parameter to the replacement parameter is in this case performed by means of a continuous and differentiable function, in particular an asymptotic function, a sigmoid function, or advantageously a ramp function. In addition, the transition is preferably gradual or successive, and in particular not sluggish, thereby advantageously achieving a particularly smooth transition, in particular from normal operation to fault operation.

It is further proposed that the steering functionality in the operational fault state be controlled and/or varied depending on the replacement parameter, wherein the replacement parameter is universally selected for a variety of different vehicle speeds, in particular higher vehicle speeds, preferably a speed greater than 15 km/h, or universally selected for any desired vehicle speeds. Advantageously safe vehicle guidance can hereby be achieved, in particular at least in critical driving situations at increased vehicle speeds.

According to one preferred configuration, it is proposed that a transition speed from the operating parameter to the replacement parameter features a low basic transition speed. The basic transition speed advantageously corresponds to a minimum transition speed and is preferably selected such that a driver notices the change or transition from the operating parameter to the replacement parameter as little as possible. In particular, the basic transition speed is in this case greater than zero. In addition, the transition speed from the operating parameter to the replacement parameter can be situationally modified depending on a steering movement of the steering handle, as a result of which sudden travel and/or steering maneuvers can advantageously be responded to. In particular, the basic transition speed can in this context be varied depending on the steering movement of the steering handle and/or depending on steering movement of the steering handle with respect to a variable, additional speed in particular. Preferably, the transition speed is in this case increased as the steering speed increases and/or as steering handle deflections increase. Particularly preferably, the transition speed increases as the steering handle is deflected increasingly and more quickly towards the maximum wheel steering angle and/or the maximum deflection. If the transition from the operating parameter to the replacement parameter is performed by means of a ramp function, then a gradient of the ramp function can be appropriately modified depending on the steering movement. A particularly safe and situation-dependent transition from the operating parameter to the replacement parameter can thereby be achieved.

It is further proposed that a vehicle deceleration be considered for the transition speed. In this context, the transition speed can in particular be modified depending on the deceleration of the vehicle. In this context, the transition speed is preferably increased given increasing deceleration of the vehicle. Particularly preferably, the more strongly the vehicle is decelerated, the higher the transition speed becomes. If the transition from the operating parameter to the replacement parameter is performed by means of a ramp function, then the gradient of the ramp function can be appropriately modified depending on the deceleration of the vehicle. This can be particularly effective in responding to particularly critical travel situations, e.g., when braking with maximum deceleration and minimum turning radius.

Furthermore, a maximum transition speed can be limited depending on the deceleration of the vehicle, thus advantageously improving controllability of the vehicle. If the transition from the operating parameter to the replacement parameter is, e.g., performed by means of a ramp function, then the gradient of the ramp function can be restricted to a maximum deceleration of the vehicle when the operating parameter is lost.

A further optimization of the transition from the operating parameter to the replacement parameter can be achieved if a vehicle speed, in particular the current speed when the operational fault state occurs or when the restricted availability of the operating parameter and/or the failure of the operating parameter appears, i.e., the last available vehicle speed in particular, is considered for the transition speed. In this case, the transition speed can in particular be modified depending on the vehicle speed, in particular the current vehicle speed at which the operational fault state occurs. Particularly preferably, the transition speed in this case increases as the vehicle speed, in particular the current speed at which the operational fault state occurs, increases. If the transition from the operating parameter to the replacement parameter is performed by means of a ramp function, then the gradient of the ramp function can be appropriately modified depending on the vehicle speed, in particular the current vehicle speed at which the operational fault state occurs.

For example, the steering functionality could correspond to an active return, in particular depending on the vehicle speed, and/or an active damping, in particular depending on the vehicle speed, in particular at the steering handle. According to a particularly preferred configuration of the disclosure, however, it is proposed that the steering functionality be a variable steering translation process between the steering handle and the wheel steering angle actuator, in particular depending on the vehicle speed. Particularly preferably, the replacement parameter is in this case chosen such that a wheel steering angle adjustable by means of the wheel steering angle actuator corresponds to a physical and/or mechanical maximum wheel steering angle in particular, or a wheel steering angle at which sufficient maneuverability can be achieved for all vehicle speeds. Doing so can in particular increase controllability, and consequently operational safety, in vehicles having a speed-dependent, variable steering translation process, in which a sudden loss of the operating parameter or vehicle speed can be particularly safety-critical. In this context, however, it is also generally conceivable to determine separate or individual replacement parameters for each of the steering functions specified and to use them in a corresponding method according to the disclosure.

The method for operating the vehicle assembly is not intended to be limited to the application and embodiment described hereinabove. In particular, the method for operating a vehicle in order to achieve the functioning described herein can comprise a number of individual elements, components, and units that differs from the number specified herein.

BRIEF DESCRIPTION OF THE DRAWINGS

Further advantages will become apparent from the description of the drawings hereinafter. The drawings illustrate an embodiment example of the disclosure. Shown are.

DETAILED DESCRIPTION

Figure 1A:
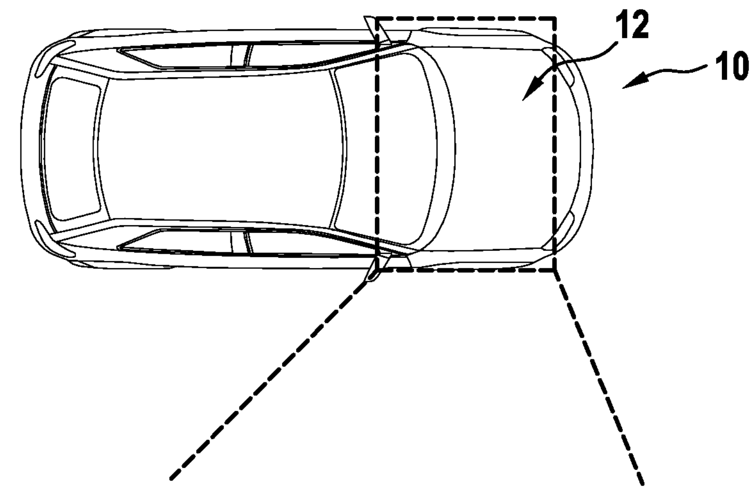
FIGS. 1A and 1B a vehicle comprising a steer-by-wire steering system in a simplified illustration.
Figure 1B:
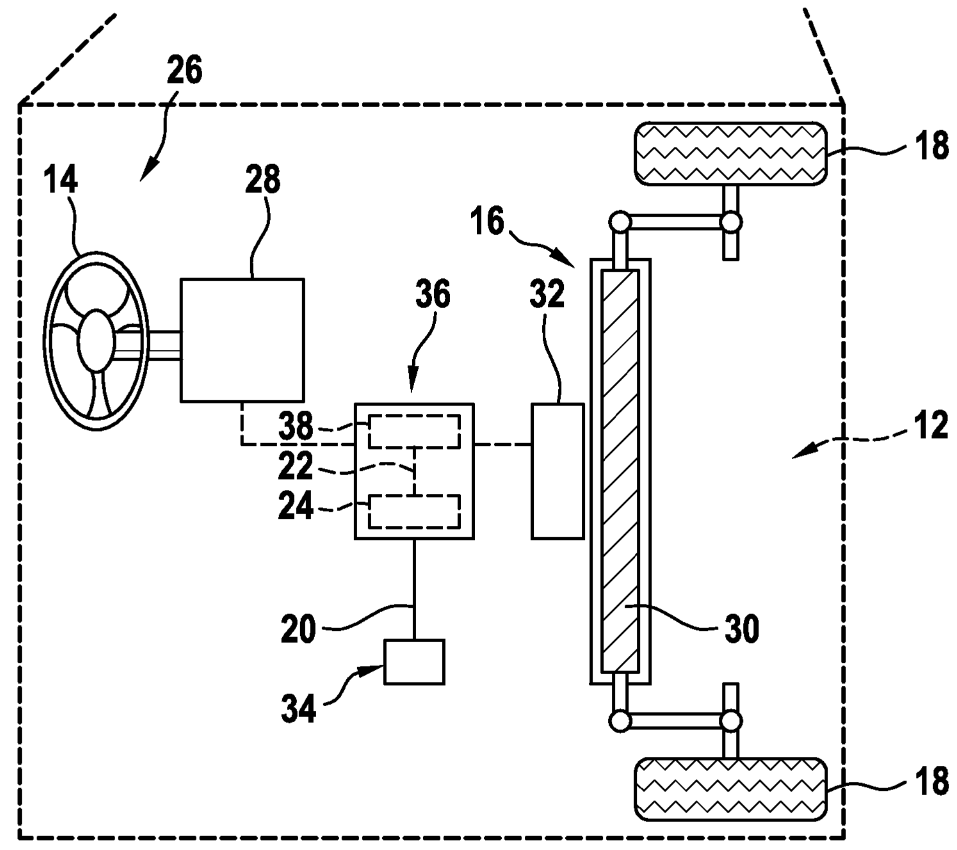

FIGS. 1A and 1B show a simplified illustration of a vehicle 10, which is, e.g., designed as a passenger vehicle comprising multiple vehicle wheels 18 and comprising a steering system 12. The steering system 12 is operatively connected to the vehicle wheels 18, and is provided to influence a direction of travel of the vehicle 10. The steering system 12 is further designed as a steer-by-wire steering system, in which a steering input is electrically transmitted to the vehicle wheels 18 in at least one operating state. However, a steering system could basically also be designed as superimposed steering and/or active steering. It is also conceivable to design a steering system as a conventional steering system, in particular an electrical power steering system.

The steering system 12 comprises an operating unit 26, in particular actuatable by a driver and/or an occupant. The operating unit 26 comprises a steering handle 14 in the form of, e.g., a steering wheel, and a feedback actuator 28 which is in particular mechanically coupled to the steering handle 14. In the present case, the feedback actuator 28 is intended to at least provide an active damping torque, thereby generating a steering resistance and/or a restoring torque onto the steering handle 14 during normal operation. To this end, the feedback actuator 28 comprises at least one electric motor (not shown) designed in particular as a permanently excited synchronous motor. A steering handle could alternatively also be designed as a joystick, a steering lever, and/or as a steering ball, or the like. In addition, the steering handle could be designed as an integrated control unit according to DE 10 2017 209 745A1. A feedback actuator could further comprise multiple electric motors. It is further conceivable to omit a feedback actuator completely.

The steering system 12 further comprises at least one wheel steering angle actuator 16. The wheel steering angle actuator 16 is mechanically separate from the operating unit 26. The wheel steering angle actuator 16 is purely electrically connected to the operating unit 26. Further, the wheel steering angle actuator 16 is designed, e.g., as a central actuator. The wheel steering angle actuator 16 is an operative connection with at least two of the vehicle wheels 18, in particular two front wheels, and is provided for translating the steering command into a steering movement of the vehicle wheels 18. For this purpose, the wheel steering angle actuator 16 comprises a steering actuating element 30 designed as, e.g., a toothed rack, and a steering actuator 30 which cooperates with the steering actuating element 32. In the present case, the steering actuator 32 comprises at least one further electric motor (not shown), designed in particular as a permanently excited synchronous motor, and is provided for controlling the steerable vehicle wheels 18. A steering system could in principle basically also comprise multiple wheel steering angle actuators designed as single-wheel actuators. Furthermore, a steering actuator could comprise multiple electric motors.

The vehicle 10 further comprises a detection sensor system 34, which is known per se. Sensing sensor technology 34 can, e.g., be designed as a wheel speed sensor system. Detection sensors 34 are provided to directly or indirectly detect a current vehicle speed of vehicle 10. In the present case, the detection sensors 34 are provided to detect a current vehicle speed of the vehicle 10 and provide an operating parameter 20 correlated with the current vehicle speed. Alternatively, however, a detection sensor system could also be designed as a sensor system deviating from a wheel speed sensor system. In addition, it is also conceivable to omit a detection sensor system.

The vehicle 10 further comprises a control device 36. In the present case, the control device 36 is designed as a steering control device and is therefore part of the steering system 12. The control device 36 also features an electrical connection to the operating unit 26 and to the wheel steering angle actuator 16. The control device 36 also features an electrical connection to the operating unit 34. The control device 36 is provided at least for controlling operation of steering system 12. In the present case, the control device 36 is provided for actuating the steering actuator 32 depending on a signal from the operating unit 26, e.g., depending on a steering command and/or a hand torque. The control device 36 can further be provided to actuate the feedback actuator 28 depending on a signal from the wheel steering angle actuator 16.

The control device 36 comprises a computing unit 24 for this purpose. The computing unit 24 comprises at least one processor (not shown), e.g., in the form of a microprocessor, and at least one memory (not shown). The computing unit 24 also comprises at least one operating program which is stored in the memory and has at least one calculation routine, at least one determination routine, at least one evaluation routine, and at least one adaptation routine.

In the present case, the control device 36 further comprises an operational memory 38. The operational memory 38 features an operative connection with the computing unit 24. In the present case, a replacement parameter 22 correlated with a replacement speed is stored in the operational memory 38. The replacement parameter 22 is a parameter applied in advance, which can, e.g., be determined during production of the vehicle 10 and/or the steering system 12 and stored in the operational memory 38.

A control device could in principle also be different from a steering control device and designed, e.g., as a single, central vehicle control device having a central computing unit. It is also conceivable to provide separate control devices and/or computing units for one wheel steering angle actuator as well as one operating unit and communicatively interconnect them. Furthermore, an operational memory could also be omitted, in particular an additional one. It is in this case conceivable to, e.g., store a replacement parameter in the memory of the computing unit 24.

In the present case, the computational unit 24 is provided to control and/or vary at least one steering functionality in a normal operating state depending on the operating parameter 20, in particular correlated with the current vehicle speed. By way of example, the steering functionality is a variable steering translation process between the steering handle 14 and the wheel steering angle actuator 16, in particular depending on the vehicle speed. Alternatively or additionally, however, a steering functionality could also correspond to an active return in particular depending on the vehicle speed, and/or an active damping in particular depending on the vehicle speed.

In the event of a fault and/or a failure of the detection sensors 34, safety-critical situations can occur in certain circumstances and/or in certain driving situations, e.g., during travel along a curve, due to the sudden elimination of the operating parameter 20 or the vehicle speed, in which the vehicle 10 is no longer controllable without suitable countermeasures. If, for example, the operating parameter 20 fails at a high vehicle speed before a hairpin curve and then freezes, this can result in the inability to negotiate the hairpin curve because, in this case, due to the more indirect steering translation at the excessive high vehicle speed, a maximum achievable wheel steering angle is not sufficient for the given turning radius. This would result in the vehicle failing to negotiate the curve. Particularly when using a steering handle designed as a joystick, as a steering lever, as a steering ball or as an integrated control unit, controllability in such situations is made even more difficult.

To avoid these safety-critical situations, a method of operating the vehicle 10 is therefore proposed in the following. The computing unit 24 in particular is in this case provided to perform the method and in particular comprises a computer program having corresponding program code means for this purpose. However, another computing unit of a vehicle could alternatively be provided for performing the method.

In the present case, in an operational fault state in which an availability of the operating parameter 20 is limited and/or a failure of the operating parameter 20 is determined, the operating parameter 20 is replaced by the replacement parameter 22 correlated with the replacement speed so that the steering functionality in the operational fault state is controlled and/or varied depending on the replacement parameter 22. In addition, a situationally adjusted transition from the operating parameter 20 to the replacement parameter 22 is performed. In the present case, the transition from the operating parameter 20 to the replacement parameter 22 is performed by means of, e.g., a ramp function so that, depending on the current situation, the ramping to the replacement parameter 22 is performed and a continuous and/or gradual transition from the current vehicle speed to the replacement speed is achieved, i.e., via a variable or situationally adjustable time interval.

The replacement parameter 22 is in this case universally selected for a variety of different vehicle speeds, wherein restrictions are tolerable, e.g., when parking or maneuvering in the low speed range. In addition, the replacement parameter 22 is selected such that the resulting steering translation is set such that a wheel steering angle adjustable by means of the wheel steering angle actuator 16 corresponds to a wheel steering angle, in particular a physical and/or mechanical, maximum wheel steering angle, or corresponds to a wheel steering angle at which sufficient maneuverability can be achieved for all vehicle speeds.

Furthermore, a transition speed from the operating parameter 20 to the replacement parameter 22 features a low basic transition speed, which is selected such that a driver notices the change or transition from the operating parameter 20 to the replacement parameter 22 as little as possible. In the present case, a slow gradient is used for ramping to this replacement parameter 22 once the operating parameter 20 or the vehicle speed is lost. In addition, the transition speed can be situationally modified depending on the steering movement of the steering handle 14, thus advantageously enabling a response to sudden driving and/or steering maneuvers. In this context, the speed of the transition speed is preferably increased at an increasing steering speed and/or deflection of the steering handle 14, wherein the speed of the transition is increased as the steering handle 14 is moved farther and more quickly toward the maximum wheel steering angle and/or the maximum deflection. In the present case, the gradient of the ramp function can be modified depending on the steering movement.

In addition, a deceleration of the vehicle 10 can be considered in the transition speed. In this context, the transition speed can, e.g., be modified depending on the deceleration of the vehicle 10. Preferably, transition speed is in this case increased as the deceleration of the vehicle 10 increases, wherein the transition speed is increased more as the vehicle 10 is decelerated more. In the present case, the gradient of the ramp function can be modified depending on the deceleration of the vehicle 10. This can be particularly effective in responding to particularly critical travel situations, e.g., when braking with maximum deceleration and minimum turning radius. Further, a maximum transition speed can be limited depending on the deceleration of the vehicle 10. In the present case, the gradient of the ramp function can restricted to a maximum deceleration of the vehicle 10 in the event of a loss of the operating parameter 20.

A further optimization of the transition from the operating parameter 20 to the replacement parameter 22 can be achieved by considering the current vehicle speed at which the operational fault state occurs, or at which the limited availability of the operating parameter 20 occurs, and/or the failure of the operating parameter 20 (i.e., the last available vehicle speed) for the transition speed. In this context, the transition speed is preferably modified depending on the current vehicle speed at which the operational fault state occurs. For example, the transition speed can in this case increase as the current vehicle speed at which the operational fault state occurs increases. In the present case, the gradient of the ramp function can be modified depending on the current vehicle speed when the operational fault state occurs.

Moreover, further steering and/or vehicle parameters, e.g., a steering speed, a steering acceleration, tie rod forces, a lateral and/or longitudinal acceleration, a yaw rate, and/or a current wheel steering angle can be considered for the transition speed.

In addition, a similar method can generally also be used for the transition from the replacement parameter 22 to the operating parameter 20, e.g., if the operating parameter 20 becomes available again in a further operational state following the operational fault state and/or a failure of the operating parameter 20 no longer exists.

Figure 2:
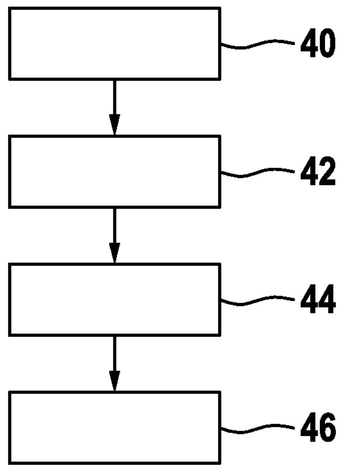
FIG. 2 an exemplary flowchart showing the main method steps in a method for operating the vehicle.

Finally, FIG. 2 shows an exemplary flowchart with the main method steps of the method for operating the vehicle 10.

One method step 40 corresponds to a normal operating state, in particular without errors. In this case, at least one steering functionality, in particular a variable steering translation process between the steering handle 14 and wheel steering angle actuator 16 in particular, is controlled and/or varied as depending on the operating parameter 20, in particular correlated with the current vehicle speed.

In a method step 42, a fault occurs in the form of a sudden loss of vehicle speed, thereby restricting an availability of the operating parameter 20 and/or causing a failure of the operating parameter 20.

In a subsequent method step 44, a situationally adjusted transition from the operating parameter 20 to the replacement parameter 22 is performed. In the present case, the transition from the operating parameter 20 to the replacement parameter 22 is performed in particular by means of a ramp function so that, depending on the current situation, the ramping to the replacement parameter 22 is performed and a continuous and/or gradual transition from the current vehicle speed to the replacement speed is achieved, i.e., via a variable or situationally adjustable time interval.

In method step 46, the at least one steering functionality, in the present case in particular the variable steering translation process between the steering handle 14 and the wheel steering angle actuator 16, is controlled and/or varied depending on the replacement parameter 22, in particular correlated with the replacement speed.

The exemplary flowchart in FIG. 2 is merely intended to describe, by way of example, a method for operating the vehicle 10. Individual method steps can in particular also vary, or additional method steps can be added. It is in this context conceivable, e.g., to modify a transition speed from the operating parameter 20 to the replacement parameter 22 situationally depending on a steering movement of the steering handle 14, depending on a deceleration of the vehicle 10, and/or depending on current vehicle speed upon occurrence of the error. The steering functionality could further correspond to, e.g., an active return depending on the vehicle speed in particular, and/or an active damping, in particular depending on the vehicle speed. In this context, it is also particularly conceivable to determine separate or individual replacement parameters for each of the steering functions mentioned and to use them corresponding to the method according to the disclosure.

What is claimed is:

1. A method for operating a vehicle comprising a steering system having a steering handle and at least one wheel steering angle actuator operatively connected to the steering handle for changing a wheel steering angle of at least one vehicle wheel of the vehicle, the method comprising:

in a normal operating state, controlling at least one steering functionality of the steering system depending on an operating parameter correlated with a current vehicle speed of the vehicle;

in an operational fault state in which an availability of the operating parameter is restricted and/or a failure of the operating parameter is determined, replacing the operating parameter by a replacement parameter correlated to a replacement speed; and performing a situationally adjusted transition from the operating parameter to the replacement parameter, wherein a transition from the operating parameter to the replacement parameter occurs at a basic transition speed, and wherein the basic transition speed is situationally modified depending on a steering movement of the steering handle.

2. The method according to claim 1, further comprising:

controlling the at least one steering functionality of the steering system in the operational fault state depending on the replacement parameter, wherein the replacement parameter is universally selected for a variety of different vehicle speeds or universally selected for any desired vehicle speed.

3. The method according to claim 1, wherein the basic transition speed is increased as a steering speed and a deflection of steering handle increase.

4. The method according to claim 1, wherein a deceleration of the vehicle is considered for situationally modifying the basic transition speed.

5. The method according to claim 1, wherein a maximum transition speed for transitioning from the operating parameter to the replacement parameter is limited depending on a deceleration of the vehicle.

6. The method according to claim 1, wherein a vehicle speed at which the operational fault state occurs is considered for situationally modifying the basic transition speed.

7. A method for operating a vehicle comprising a steering system having a steering handle and at least one wheel steering angle actuator operatively connected to the steering handle for changing a wheel steering angle of at least one vehicle wheel of the vehicle, the method comprising:

in a normal operating state, controlling at least one steering functionality of the steering system depending on an operating parameter correlated with a current vehicle speed of the vehicle;

in an operational fault state in which an availability of the operating parameter is restricted and/or a failure of the operating parameter is determined, replacing the operating parameter by a replacement parameter correlated to a replacement speed; and performing a situationally adjusted transition from the operating parameter to the replacement parameter, wherein the at least one steering functionality is a variable steering translation process between the steering handle and the at least one wheel steering angle actuator.

8. The method according to claim 7, wherein the replacement parameter is selected such that the wheel steering angle corresponds to a maximum wheel steering angle or corresponds to the wheel steering angle at which sufficient maneuverability can be achieved for all vehicle speeds.

9. A computing unit for performing the method according to claim 1.

10. A vehicle comprising:

a steering system including a steering handle and at least one wheel steering angle actuator operatively connected to the steering handle and configured to change a wheel steering angle of at least one vehicle wheel of the vehicle; and a computing unit operatively connected to the steering system and configured to:

in a normal operating state, control at least one steering functionality of the steering system depending on an operating parameter correlated with a current vehicle speed of the vehicle, in an operational fault state in which an availability of the operating parameter is restricted and/or a failure of the operating parameter is determined, replace the operating parameter by a replacement parameter correlated to a replacement speed, and perform a situationally adjusted transition from the operating parameter to the replacement parameter, wherein a transition from the operating parameter to the replacement parameter occurs at a basic transition speed, and wherein the basic transition speed is situationally modified depending on a steering movement of the steering handle.

11. The vehicle according to claim 10, wherein the steering system is a steer-by-wire steering system.

* * * * *